United States Patent [19]

Meyers et al.

[11] Patent Number: 4,495,996
[45] Date of Patent: Jan. 29, 1985

[54] METHOD FOR SCALE REMOVAL AND SCALE INHIBITION IN A WELL PENETRATING A SUBTERRANEAN FORMATION

[75] Inventors: Kevin O. Meyers, Plano; Harry L. Skillman, Jr., Dallas, both of Tex.

[73] Assignee: Atlantic Richfield Company, Los Angeles, Calif.

[21] Appl. No.: 556,758

[22] Filed: Dec. 1, 1983

[51] Int. Cl.$^3$ .................. E21B 43/27; E21B 43/28
[52] U.S. Cl. .................. 166/279; 166/244 C; 166/307; 166/312; 252/8.55 B
[58] Field of Search ............ 166/244 C, 271, 273, 166/274, 307, 310, 312, 371; 252/8.55 B, 8.55 C, 8.55 E

[56] References Cited

U.S. PATENT DOCUMENTS

| | | | |
|---|---|---|---|
| 1,809,546 | 6/1931 | Bowman | 166/312 |
| 3,481,400 | 12/1969 | Kerver et al. | 166/279 |
| 3,529,666 | 9/1970 | Crowe | 166/312 X |
| 3,543,856 | 12/1970 | Knox et al. | 166/307 X |
| 4,191,249 | 3/1980 | Sarem | 166/244 C |
| 4,213,866 | 7/1980 | Ashby et al. | 166/307 X |

FOREIGN PATENT DOCUMENTS 791943 12/1980 U.S.S.R. .................. 166/244 C

Primary Examiner—George A. Suchfield
Attorney, Agent, or Firm—F. Lindsey Scott

[57] ABSTRACT

A method for removing scale and inhibiting the formation of scale in a well penetrating a subterranean formation for the production of fluids from the formation, the method comprising;
(a) injecting an aqueous solution of EDTA into the well in an amount and for a time effective to remove scale from the well; and,
(b) injecting a scale inhibitor through the well and into the subterranean formation surrounding the well.

6 Claims, 1 Drawing Figure

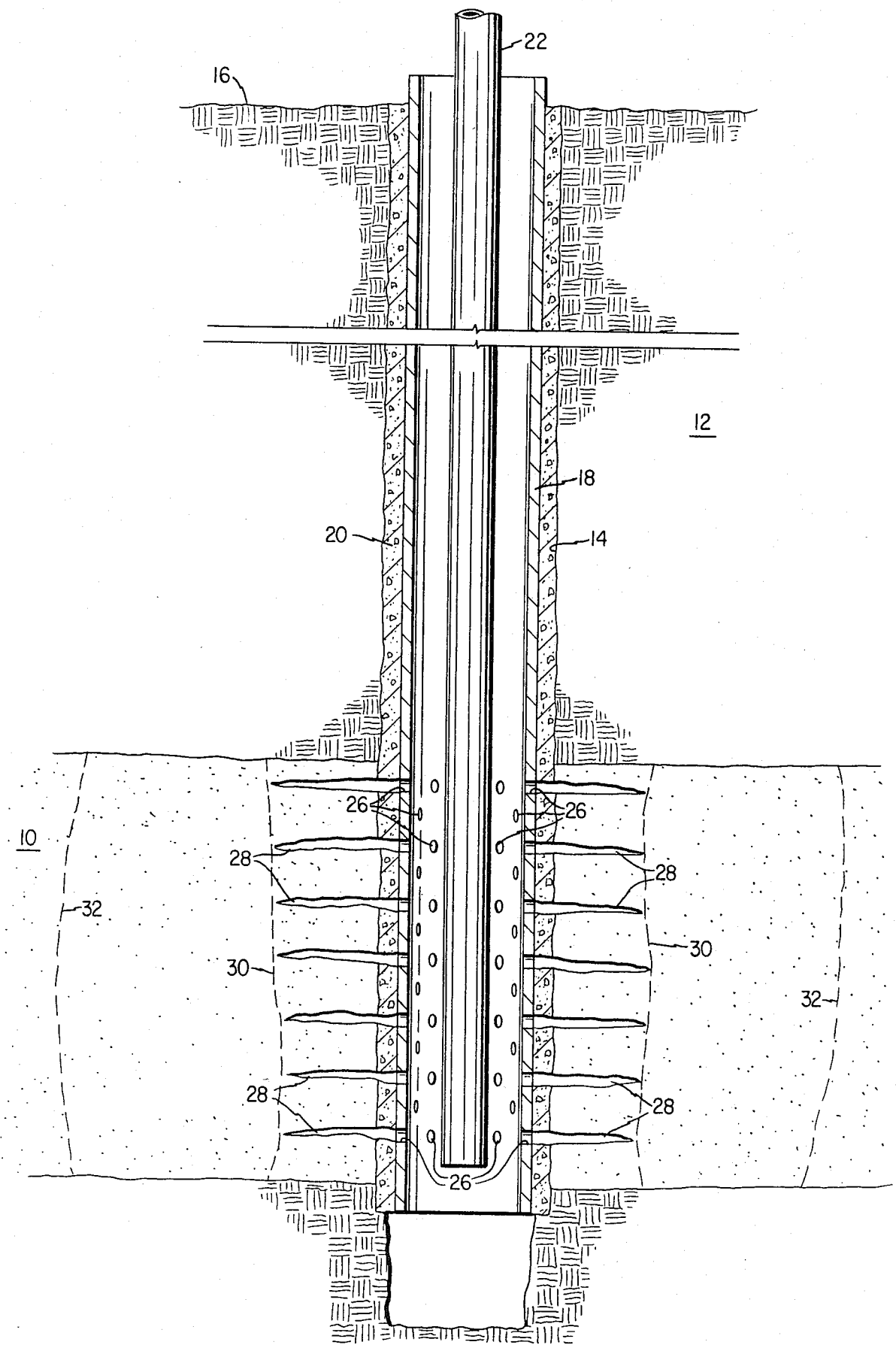

METHOD FOR SCALE REMOVAL AND SCALE INHIBITION IN A WELL PENETRATING A SUBTERRANEAN FORMATION

This invention relates to the removal of scale and the prevention of scale formation in a well penetrating a subterranean formation.

In the production of fluids from subterranean formations through a well penetrating the formation, it is necessary that the well and the formation around the well be kept free of materials which would plug either the formation or the well. Some such plugging materials may comprise drilling fluids, cement filtrates and the like used during the drilling and completion of the well. Methods are well known to the art for preventing the entry of these materials into the formation or recovering them from the formation or both so that the formation is not plugged.

After completion of the well and the initiation of the production of fluids from the well plugging or partial plugging of the well, perforations through the well casing or the formation can result from the formation of scale as fluids are produced from the formation. Such scale formation can occur as a result of incompatible fluids in the well, i.e, fluids which when mixed produce precipitates, or from the formation fluids during production. Since the use of incompatible fluids can usually be avoided, the problem of greatest concern is the formation of precipitates from the formation fluids during production. One precipitate which is frequently encountered as scale is calcium carbonate.

Calcium carbonate is readily formed in such environments by reactions such as

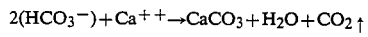

$$2(HCO_3^-) + Ca^{++} \rightarrow CaCO_3 + H_2O + CO_2 \uparrow$$

Such reactions are favored by reductions in the pressure on the formation fluids. Accordingly, in formation fluids which contain soluble carbonates and/or bicarbonates and calcium or other multi-valent cations such as magnesium, barium, iron and the like which form relatively insoluble carbonate compounds, precipitates tend to form at the point at which the pressure in the formation fluids is reduced. Such points tend to be in the formation adjacent the well or in perforations in the well casing. In either instance the production of fluids from the formation is restricted as such scale forms.

In the production of fluids from formations which are susceptible to such scale formation, the production of fluids from such wells tends to decline steadily as the scale forms. To restore the production rates from such wells, various methods have been used.

Such wells can be re-perforated by opening new perforations through the well casings and exposing new formation surfaces. Such methods can be used to restore production rates, but are subject to plugging by the formation of additional scale. These methods are relatively expensive and are of limited value in formations where rapid scale formation occurs.

Acid treatments have been used effectively for the removal of such scale. While the use of acid treatments is effective in many instances it does require the removal of the well from production for the acid treatment process which is disadvantageous especially if the formation is subject to rapid scale formation. Further, the production rate begins to decline after the treatment as more scale is formed so that during much of its producing life the well is producing fluids at a reduced rate.

EDTA, ethylenediamine tetraacetic acid salts have been used to remove such scale. The EDTA is generally used in aqueous solution to contact the zone of interest to dissolve such scale. The process is similar to that used with acid treatments and suffers many of the same disadvantages.

To overcome the disadvantages of reduced production rates scale inhibitors have been used. Such scale inhibitors are known to the art as discussed in *Water-Formed Scale Deposits,* Jack C. Cowan and Donald J. Weintritt, Gulf Publishing Company, Houston, Tex. 1976, Chapter 7, "Scale and Deposit Prevention and Control", which is hereby incorporated in its entirety by reference. Scale inhibitors such as phosphate esters, polyacrylamides and phosphonic acid derivatives have been used for such purposes. Such scale inhibitors may be used by: (a) acid cleaning the well, well perforations and the formation surrounding the well, (b) removing the cleaning fluids and (c) injecting the scale inhibitor into the formation. The scale inhibitor is then retained in the formation and released slowly with the produced fluids. The presence of small amounts of scale inhibitor in the produced brine (less than 50 ppm) is effective to inhibit the formation of scale in the well, well perforations and in the formation surrounding the well.

In some instances it has been found that a step decline in production rates from such wells occurred immediately after the scale inhibitor treatment. The step decline is typically followed by a long period of stable production rates. Since this step decline in production rates is undesirable, but the stable production rates resulting from the use of scale inhibitors is desirable, a continuing effort has been directed to the development of a method by which such losses in the production rate can be avoided when scale inhibitors are used.

It has been disclosed in U.S. patent application Ser. No. 542,249 entitled "AN IMPROVED METHOD FOR SCALE REMOVAL AND SCALE INHIBITION IN A WELL PENETRATING A SUBTERRANEAN FORMATION" filed Oct. 14, 1983 by Kevin O. Meyers that such step declines can be reversed and the initial production rates after well cleaning with acid restored by an improvement comprising treating the well with EDTA.

According to the present invention such step declines can be avoided by a method for removing scale and inhibiting the formation of scale in a well penetrating a subterranean formation for the production of fluids therefrom, the method comprising:
   (a) injecting an aqueous solution of EDTA into the well in an amount and for a time effective to remove scale from the well; and,
   (b) injecting a scale inhibitor through the well and into the subterranean formation surrounding the well.

The FIGURE is a schematic diagram of a cased well penetrating a subterranean formation.

In the FIGURE, a subterranean formation 10 is shown beneath an overburden 12. A wellbore 14 penetrates formation 10 from the surface 16. Wellbore 14 includes a casing 18 cemented in place by cement 20 from surface 16 through formation 10. Wellbore 14 as shown has been completed to a depth greater than the bottom of formation 10, but has not been cased to its full depth. Casing 18 has been perforated in the zone of formation 10 by a plurality of perforations 26 which extend through casing 18 and cement 20 and via extensions 28 into formation 10. Such perforations permit the flow of formation fluids into casing 18. A tubing 22 is positioned in casing 18.

In practice, after wellbore 14 has been drilled and completed as shown, production occurs from formation 10 by the flow of fluids through perforations 26 into the wellbore with the fluids then being recovered through casing 22 if the formation pressure is sufficient. A variety of other well-known techniques can be used for the recovery of fluids from such formations such as pumping, gas lift, and the like. Further, in some instances, the casing may not extend through formation 10 but rather gravel packs, screens and the like may be used or the formation may be produced open hole, etc., as known to the art. The present invention is effective with such variations. In the production of fluids from formation 10 in many instances scale tends to be deposited in zones where the formation pressure is reduced as the fluids flow into the wellbore. Such zones typically are perforations 26 or the formation in an area 30 adjacent the wellbore. Since these are zones of flow constriction the formation of scale in these zones results in a reduction in the production of fluid from formation 10. As discussed, such deposits, in many instances, can be removed by mineral acid treatments. The acid treatment can be accomplished by pumping a material which is desirably immiscible with the acid through tubing 22 and into the annulus of casing 18 and thereafter pumping a quantity of acid through tubing 22 into the vicinity of perforations 26. The mineral acid is used as an aqueous solution in an amount effective to remove scale from the well casing 18, casing perforations 26 and the portions of formation 10 to be contacted; and, is maintained in contact with the well casing 18, casing perforations 26 and the contacted portions of formation 10 for an effective time to remove the scale. Contact times from about 0 (i.e., the acid is pumped into and immediately produced from the well) to about 8 hours are typical. The acid is normally removed from the well by the resumption of production of fluids from the well. In many instances, such mineral acid solutions comprise aqueous solutions of hydrochloric acid or nitric acid, with hydrochloric acid being greatly preferred. The solution may also contain a corrosion inhibitor to prevent reaction of the acid with the casing, tubing, and other metallic components of the well. Typical acid concentrations are from about 5% to about 28% acid in aqueous solution. The use of such acid treatments is well known to those skilled in the art. In many instances, the acid treatment is used to treat the wellbore, perforations 26 and zone 30 adjacent wellbore 14 and is controlled to avoid pushing any substantial amount of the acid into the formation. In other instances, it may be desirable to treat the formation with the acid and if such is the case, then pressure is used to force the acid into the formation. If the well is not cased through the zone of interest the formation is similarly treated.

When EDTA treatments are used, a similar procedure is followed.

When scale inhibitors are used, the scale inhibitor is pumped into the formation a substantial distance shown as zone 32 in the FIGURE. The scale inhibitor is at least partially retained in the formation and slowly released into the produced fluids as production of fluids from the formation occurs. Scale inhibitors are not effective to remove scale, but are effective to prevent future scale formation.

It has been observed that in some instances, after an acid treatment, followed by a suitable interval of production to remove acidic components from the formation and wellbore, and completion of a scale inhibitor injection, a step decline in the production rate of the well occurs immediately with the production rate falling to a lower rate than the production rate after acidizing. The production rate then remains relatively stable at the lower production rate over relatively long periods of time. While the stable production rate is highly desirable, it is undesirable that the stable rate be at the lower level.

It has been disclosed in U.S. Pat. Ser. No. 542,249 that much of such step declines can be reversed by the use of a EDTA contacting step. The EDTA is placed in contact with perforations 26 and/or formation 10 as an aqueous solution by a process similar to that used for the acid treatment. The EDTA is injected as an aqueous solution in an amount and for a time effective to dissolve precipitates of multi-valent cations and scale inhibitor. Typical EDTA concentrations are from about 0.1 to about 0.8 pounds per gallon of solution and typically contact times will vary from about 0 (i.e., the EDTA is pumped into and immediately produced from the well) to about 24 hours. The volume of solution used will vary widely based upon the thickness of formation 10 and other factors known to the art. Volumes from about 5 to about 20 gallons per foot of perforated zone or production zone are typical. Larger volumes are required if the EDTA is to fill zone 32 or the like. EDTA has been found to restore the step decline in production rates.

By the use of the present method such step declines are avoided. An aqueous solution of EDTA in an amount and for a time sufficient to remove scale from the well is injected to remove scale. Typically, the EDTA solution is injected by a procedure similar to that used for mineral acid treatments. The zone normally treated is the portion of the well casing or wellbore extending through the formation from which fluids are to be produced. The well casing perforations and the formation in the vicinity of the well are particularly vulnerable to scale formation and these are often the primary target of the scale removal operation. The EDTA solution may be injected through tubing 22 following a liquid such as crude oil or the like which is substantially immiscible with the aqueous EDTA solution so that the EDTA solution moves through tubing 22 into the vicinity of perforations 26. Pumping is then stopped and the EDTA solution left in contact with perforations 26 and portions of formation 10 about the wellbore 14. The EDTA solution typically contains from about 0.1 to about 0.8 pounds of EDTA per gallon of solution. Saline aqueous solutions may be used. Contact times from about 0 (i.e., the EDTA is pumped into and immediately produced from the well) to about 24 hours may be used for scale removal.

After production of the EDTA solution from the well, a scale inhibitor is injected into the formation through the well. The scale inhibitor is typically injected as an aqueous or saline aqueous solution by a procedure similar to that used for the EDTA scale removal step except that while the scale inhibitor solution is in the vicinity of formation 10 in wellbore 14 pressure is applied to force the scale inhibitor solution a distance into formation 10, i.e., a zone such as zone 32 or the like. After the scale inhibitor treatment, the well is returned to production and portions of the scale inhibitor solution may be produced from the well. Residual scale inhibitor is retained in the formation and slowly released from the formation with the produced aqueous fluids as the well is produced. The scale inhibitor is released slowly over long periods of time and is effective to prevent scale formation when present even in small quantities, i.e., less than 50 parts per million in the aqueous fluids. Typically, the aqueous scale inhibitor solution contains from about 0.04 to about 0.3 pounds of scale inhibitor per gallon. The use of scale inhibitors for such purposes is considered to be known to those skilled in the art. The scale inhibitor solution may be maintained in the formation for a time from about 0 (i.e., the scale inhibitor solution is pumped into and immediately recovered from the formation) to about 24 hours.

Various scale inhibitors are know to those skilled in the art, such as phosphate esters, polyacrylamides, phosphonic acid derivatives and the like. The selection of the preferred scale inhibitor is highly dependent upon the specific formation environment.

While Applicant does not wish to be bound by any particular theory, it appears that when scale inhibitors are used, these materials tend to precipitate in the presence of multi-valent cations such as calcium, magnesium, barium, iron and the like. These precipitates of multi-valent cations and scale inhibitor are relatively insoluble in the formation environment and are also relatively insoluble in acids. As a result, such materials are not removed by acid treatments and are very slowly removed by the continued production of fluids from the formation.

While it has been disclosed in U.S. patent Ser. No. 542,249 that the use of EDTA is effective to remove these precipitates, it is even more desirable to avoid the formation of such precipitates. It is believed that when mineral acids are used for scale removal, substantial quantities of multi-valent cations such as calcium, magnesium, barium, iron and the like are left in the formation and combine with the injected scale inhibitor to form the precipitates. By contrast, when EDTA is used for scale removal the EDTA tends to chelate with the multi-valent cations, thus removing them from the formation environment. Further residual quantities of EDTA left in the formation, wellbore, and the like, are effective to continue to chelate with multi-valent cations, thus further preventing precipitate and scale formation.

While it is not preferred, an acid treatment can be used prior to the EDTA contacting, if necessary or desirable. The same advantages are realized since the EDTA is effective to remove the multi-valent cations from the formation environment prior to the injection of the scale inhibitor, thus preventing the formation of precipitates of multi-valent cations and scale inhibitors.

Having thus described the invention by reference to its preferred embodiments, it is noted that the embodiments described are illustrative rather than limiting in nature and that many variations and modifications are possible within the scope of the present invention. Many such variations and modifications may be considered obvious and desirable by those skilled in the art upon a review of the foregoing description of preferred embodiments.

I claim:

1. A method for removing scale and inhibiting the formation of scale in a well penetrating a subterranean formation for the production of fluids from said formation, said method comprising;
   (a) injecting an aqueous solution of a mineral acid into said well in an amount and for a a time effective to remove scale from said well;
   (b) injecting an aqueous solution of EDTA into said well in an amount and for a time effective to remove scale from said well; and,
   (c) injecting a scale inhibitor through said well into said formation about said well.

2. The method of claim 1 wherein said scale comprises calcium carbonate.

3. The method of claim 2 wherein said scale inhibitor comprises a phosphonic acid derivative.

4. The method of claim 2 wherein said scale inhibitor comprises a phosphate ester.

5. The method of claim 2 wherein said scale inhibitor comprises polyacrylamides.

6. The method of claim 2 wherein said injection of said aqueous solution of EDTA is controlled to contact the well casing perforations and portions of said formation near said well.

* * * * *